United States Patent
Nigam et al.

(10) Patent No.: US 10,579,599 B2
(45) Date of Patent: Mar. 3, 2020

(54) UPGRADE OF HETEROGENEOUS MULTI-INSTANCE DATABASE CLUSTERS

(71) Applicant: Oracle International Corporation, Redwood Shores, CA (US)

(72) Inventors: Rajat Nigam, Karnataka (IN); Akanksha Sheoran Kaler, Rajasthan (IN); Matthew Stephen McKerley, Berkeley, CA (US); Bharat Shrikrishna Paliwal, Fremont, CA (US); Srivatsan Vijayaraghavan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 766 days.

(21) Appl. No.: 14/086,751

(22) Filed: Nov. 21, 2013

(65) Prior Publication Data

US 2015/0142728 A1 May 21, 2015

(51) Int. Cl.
G06F 16/21 (2019.01)
G06F 16/23 (2019.01)
G06F 8/65 (2018.01)

(52) U.S. Cl.
CPC .............. G06F 16/21 (2019.01); G06F 8/65 (2013.01); G06F 16/23 (2019.01)

(58) Field of Classification Search
CPC ......... G06F 17/30289; G06F 17/30345; G06F 17/30365
USPC ....................................................... 707/609
See application file for complete search history.

(56) References Cited

U.S. PATENT DOCUMENTS

| | | | |
|---|---|---|---|
| 7,536,599 B2 | 5/2009 | Paliwal et al. | |
| 7,698,391 B2 | 4/2010 | Paliwal et al. | |
| 7,937,455 B2 | 5/2011 | Saha et al. | |
| 7,962,788 B2 | 6/2011 | Manglik et al. | |
| 8,341,619 B2 | 12/2012 | Pall et al. | |
| 8,843,412 B2 | 9/2014 | Paliwal et al. | |
| 8,892,712 B2 | 11/2014 | Kuchibhotla et al. | |
| 2005/0108247 A1* | 5/2005 | Heinla | G06F 17/30575 |
| 2006/0048137 A1 | 3/2006 | Nosseir et al. | |
| 2007/0240150 A1 | 10/2007 | Gangwar et al. | |
| 2012/0137278 A1* | 5/2012 | Draper | G06F 8/65 717/170 |

(Continued)

*Primary Examiner* — James Trujillo
*Assistant Examiner* — John J Morris
(74) *Attorney, Agent, or Firm* — Invoke

(57) ABSTRACT

A method, system, and computer program product for management of large multi-database installations. The method form commences by analyzing a multiple database installation to determine a set of candidate upgrade operations to apply to individual instances of heterogeneous databases in the multiple database installation, and then scheduling an order in which order to apply individual operations from among the set of candidate upgrade operations. In exemplary operation, the candidate upgrade operations comprise database version upgrades, database stack upgrades, and/or database listener upgrades. Some embodiments exploit homogeneity and/or groupings in order to parallelize performance of various upgrade operations during mass upgrade of multi-database installations. In addition to performing upgrade operations in the form of database version upgrades, database stack upgrades, and/or database listener upgrades, the installation can be upgraded by receiving application upgrades.

23 Claims, 8 Drawing Sheets

(56) References Cited

U.S. PATENT DOCUMENTS

| | | | | |
|---|---|---|---|---|
| 2013/0117441 A1* | 5/2013 | Kuchibhotla | ........... | H04L 43/12 709/224 |
| 2014/0068584 A1* | 3/2014 | Lim | ......................... | G06F 8/65 717/168 |
| 2014/0337282 A1* | 11/2014 | Mesika | ............. | G06F 17/30289 707/609 |
| 2015/0019497 A1* | 1/2015 | Bostock | ............ | G06F 17/30306 707/687 |

* cited by examiner

300

[ + ] Group_A

302

Nodes: {N11, N21}
Database Version: 10.1.0.4
Database Platform: Solaris SPARC: Solaris 9
Patch level: Oct 08 CPU, ......(click to see entire list)
Topology/Configuration: Clusterware

[ – ] Group_B

304₁

Nodes: {N22, N31, N32}
Database Version: 10.2.0.4
Database Platform: Linux x86: OEL 5 update 2
Patch level: July 09 CPU, ......(click to see entire list)
Topology/Configuration: Non shared home ASM

304₂

| Readiness Pass? | Database Target | Home Directory | Host | Upgrade Path and Upgrade Order |
|---|---|---|---|---|
| ☑ | Siebel1 | /u01/app/Oracle/db1.... | Sbhost1 | 1) OS Patches  Apply patch xyz |
|  | ASM1 | /u01/app/Oracle/asm1.... |  |  |
| ☑ | Siebel2 | /u01/app/Oracle/db2.... | Sbhost1 | 2) ASM Patches  Apply patch abc123 |
|  | ASM2 | /u01/app/Oracle/asm2.... |  |  |
| ☑ | Siebel3 | /u01/app/Oracle/db3.... | Sbhost2 | 3) DB Patches  Apply July CPU  Timezone Patch |
|  | ASM3 | /u01/app/Oracle/asm3.... |  |  |
|  |  |  |  | 4) Database Upgrade Path  Version 10.2.0.4 → 11.2  Version 10.2.0.4 → 11.2 |

306

[ + ] Group_C

FIG. 3

UPGRADE OF HETEROGENEOUS MULTI-INSTANCE DATABASE CLUSTERS

FIELD

The disclosure relates to the field of management of large multi-database installations and more particularly to techniques for determining upgrade schedules for a non-intrusive mass upgrade of heterogeneous multi-database installations.

BACKGROUND

Database systems are everywhere. Databases are delivered as constituent or required components of many enterprise applications, and accordingly databases have proliferated as enterprise applications have proliferated. In some situations, a single installation may comprise many different databases. And in some cases the individual instances of the different databases are of different versions, and/or are running on different hardware, and/or are running under different operating systems, and/or are running different versions of applications, and so on. Such installations become more and more complex over time, and until the advent of the herein-disclosed techniques there has been no coordination for upgrades of heterogeneous multi-instance database clusters. Barriers that heretofore have prevented coordination for upgrades of heterogeneous multi-instance database clusters include:

Difficulty to obtain advice and clarity in best practices pertaining to upgrades, especially in large environments with databases spanning multiple versions, multiple platforms, and multiple configurations.

Lack of automation to assist in mass upgrade of databases.

Lack of impact analysis before initiating the upgrade.

Fear of upgrade failure or lack of a fallback plan to restore environments in cases of a failure during the upgrade processes.

Significant downtime for mission critical databases.

Performance degradation once the upgrade has completed.

Lack of proper testing after the upgrade operations, and so on.

For the above reasons many organizations choose to postpone their database upgrades, or organizations may choose to only perform upgrades to a limited number of databases within a multi-database cluster. This severely retards adoption of new database releases and features.

While an upgrade of a single instance of a database in a particular installation might have a small set of dependencies, an upgrade of multiple databases in a heterogeneous multiple database installation can have a massive number of dependencies. And the number of dependencies increases super-linearly with the number of database instances. Still worse, the sheer number of possibilities and the manner in which upgrade operations are applied (e.g., which patches to apply to which databases, what order to perform upgrade operations, etc.) demands computer-implemented techniques.

What is needed is a technique or techniques for determining aspects of homogeneity or other groupings of instances of databases in a heterogeneous multi-instance database installation, and then determining a sequencing order (e.g., sequences of operations) in which to perform the upgrade over the individual database instances in the installation.

None of the aforementioned technologies have the capabilities to perform the herein-disclosed techniques for determining upgrade schedules for mass upgrade of multi-database installations. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for determining upgrade schedules for a non-intrusive mass upgrade of multi-database installations.

The techniques herein include methods for analyzing a multiple database installation to determine a set of candidate upgrade operations to apply to individual instances of databases in the multiple database installation, and then scheduling an order in which order to apply individual operations from among the set of candidate upgrade operations. In exemplary operation, the candidate upgrade operations comprise database version upgrades, database stack upgrades, database listener upgrades, and/or application upgrades.

Some embodiments exploit homogeneity and/or groupings in order to parallelize the performance of various upgrade operations over the non-intrusive mass upgrade of multi-database installations. A shorter upgrade procedure reduces intrusiveness of the mass upgrade.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 3 depicts a graphical user interface to identify group attributes as used in systems for determining upgrade schedules for a non-intrusive mass upgrade of multi-database installations, according to some embodiments.

DETAILED DESCRIPTION

Figure 1A:
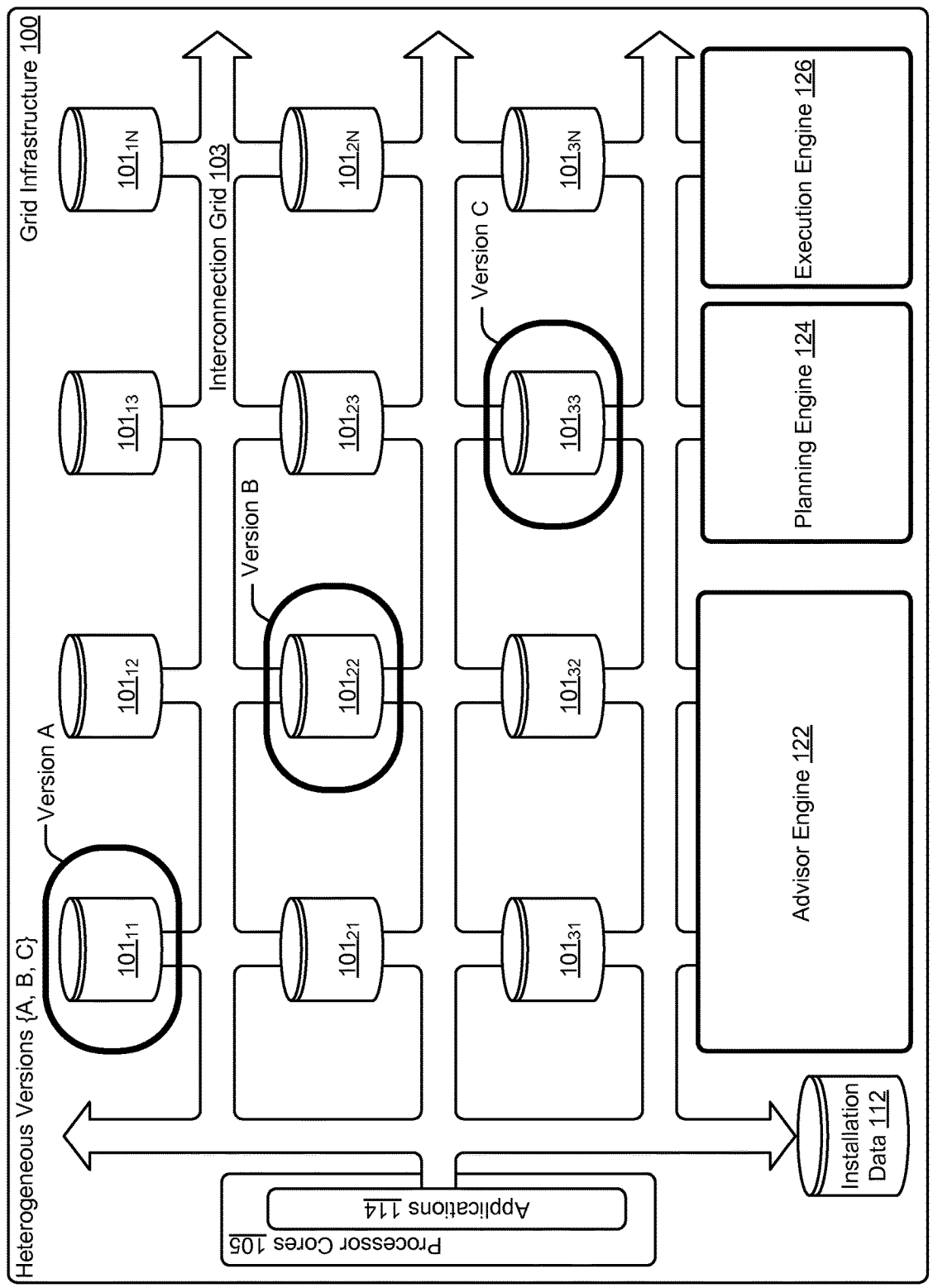
FIG. 1A depicts a portion of computing infrastructure forming an environment in which a non-intrusive mass upgrade of multi-database installation can be performed, according to some embodiments.

Some embodiments of the present disclosure address the problem of upgrading a heterogeneous database installation (e.g., in large environments with databases across versions, platforms and configurations), and some embodiments are directed to an improved approach for implementing determining upgrade schedules for a non-intrusive mass upgrade of multi-database installations. More particularly, disclosed herein and in the accompanying figures are exemplary environments, methods, and systems for performing a non-intrusive mass upgrade of a multi-database installation.

Overview

In some database installations, many heterogeneous databases run on different hardware, and/or run under different operating systems, and/or are configured to run different versions of applications, and so on. Such installations become more and more complex over time, which increases in complexity exacerbates the problem of upgrading the full set of database instances in a multiple database installation. As disclosed herein, this problem is solved by a computer-implemented system for analyzing the multiple database installation to determine which instances need to be upgraded, in which order the individual instances need to be upgraded, and which upgrade operations need to be performed in which order.

The aspect of heterogeneity among the components of a database installation introduces complexities in determining which upgrade operations need to be performed in which order. A heterogeneous multi-instance database environment often comprises databases of differing version numbers (e.g., having different and sometimes incompatible layouts), and any two database instances in the heterogeneous environment might be configured with different middleware components and/or different applications. Moreover, an individual component within one stack of components configured for operation with a first database might not be compatible with any or all of the components configured for operation with a second database. Thus, a heterogeneous multi-instance database environment often comprises two sets of interrelated stacks of components such that an upgrade operation applied to the first set of components might impact the compatibility or performance of a second stack of components. A technique is needed to interrelate the individual components of the two stacks of components and to identify an environment-wide compatible upgrade path for performing the upgrade.

One approach involves a computer-implemented method for analyzing a multiple database installation to determine a set of upgrade candidate databases, and then scheduling an order of operations to apply to individual ones from among the set of upgrade candidates. Compatibilities and dependencies are observed. In some situations the analyzing procedures include checking for compatibility between the current version and a candidate upgrade version, and/or the analyzing procedures includes dynamic checking for readiness (e.g., where the readiness checks include confirming patch application completion, added memory verification, etc.).

In some cases checkpointing is automatically performed so as to provide a roll-back facility in case a need arises to roll back to a state prior to the upgrade. In other cases the upgrade procedure may initiate a series of automated operations and tests that are performed on the upgraded systems, and making additional changes based on the results of the automated tests (e.g., converting into multi-instance database configurations, switching the applications to use the upgraded systems, enabling new features, etc.).

Still further automation is provided in that after scheduling and performing an upgrade the automated procedures may initiate a series of post-upgrade operations on the upgraded systems.

Certain exemplary embodiments organize workflow into three phases:

An analysis phase (e.g., using an advisor),
A planning phase (e.g., using the results of the advisor), and
An execution phase (to carry out the plans).

These phases are introduced successively below, and are further discussed as pertaining to the appended figures.

Analysis Phase

One purpose of providing an advisor engine in an analysis phase is to produce sufficient analysis results such that a planning engine can determine upgrade schedules to pass to an execution engine (e.g., a supervisor of operations for a non-intrusive mass upgrade of multi-database installations). Additionally, an advisor engine might proactively notify users of possible and/or recommended upgrades (e.g., to newer versions).

An advisor engine considers aspects of the platform (e.g., a computing cluster, cloud infrastructure, grid infrastructure), version or versions, user- or site-configuration settings, and/or other aspects of a database. For example, an advisor engine can generate upgrade advisories for a database or a group of databases which are homogeneous or otherwise specific to a given environment and the advisor engine might generate and/or publish such upgrade advisories (e.g., advisories for upgrade to upward-compatible versions) at opportune moments in time.

Strictly as examples, an advisory engine might publish the following upgrade-related information about each database in the installation:

Upgrade path to the latest release of the database software (new major release/latest patchset of a recent major release). A path may refer to compatible versions of related components such as middleware, clusterware, listeners, applications and/or grid infrastructure upgrade paths.
Based on the configuration of the database, an upgrade path might include a recommended sequence of upgrades of various stack components.
A suggested list and sequence of patches as may be recommended (or required) to apply to various stack components.
Operating system patches as may be recommended (or required) to provide compatibility for various stack components.
A list of applicable compatibility rules (e.g., compatibility rules to be observed in an upgrade).

TABLE 1

Compatibility Chart

| Example Number | Description: Compatibility Rule Examples |
|---|---|
| Compatible Database and Stack Upgrade | A database of version X can work on database stack version Y provided that Y ≥ X. |
| Compatible Database and Listener Upgrade | A database system comprises one or more listeners. A listener can be a separate process that runs, for example, on the database server computer. A listener receives incoming client connection requests and manages the flow of traffic pertaining to those requests to and from |

TABLE 1-continued

Compatibility Chart

| Example Number | Description: Compatibility Rule Examples |
|---|---|
| | the database server. A database of version X can work with a Listener version Y provided that Y ≥ X. |
| Compatible Database and Application Upgrade | An application version Z works with the database, but is only certified to work with database versions between X1 and X2 (X2 > X1). The application version Z may not be compatible with a database version A where A < X1 and A > X2. |

As can be seen from Table 1, a particular database can work with any respective listener whose version is greater than or equal to the version of the particular database. Other techniques are possible to codify and enforce version relationships and constraints. For example, rather than use a numbering system to imply permitted upgrade paths, the paths themselves can be codified as a list or a graph or any other data structure.

TABLE 2

Operation Constraint Chart

| Upgrade Operation ID | Desired Upgrade Operations | Installation Constraints |
|---|---|---|
| A | Upgrade to listeners Version 2.2 | Requires installed databases of version 2.0 or higher |
| B | Upgrade database version from 1.1 to 2.2 | Requires a compatible listener to be installed before database upgrade operations |
| C | Upgrade Application from version 1.1 to 2.2 | Requires the same version of any underlying databases to be installed. Some applications access two or more databases. |

Referring to Table 2, the enumerated ordering is given in Table 3.

TABLE 3

Operation Ordering Chart

| Upgrade Operation ID | Comment |
|---|---|
| A-B-C | OK: Does not violate constraints |
| A-C-B | Not possible. Would violate Application installation constraints |
| B-C-A | Not possible: Would violate database installation constraints |
| B-A-C | Not possible: Would violate database installation constraints |
| C-A-B | Not possible: Would violate Application installation constraints |
| C-B-A | Not possible: Would violate Application installation constraints |

In some cases the aforementioned published advisories are grouped based one or more of the following criteria:
  Databases of same version, listener, and connected application levels,
  Databases of same version, patchset, and patch level (or combination thereof),
  Databases running under the same installation configuration, and/or,
  Databases running under the same topology (e.g., file layout or database layout).
As is further discussed below, identification of groupings facilitate identification of a common set of actions to be taken for a group. Further, such groupings facilitate parallelization of a set of upgrade operations. For example, multiple databases deemed to be in the same group can be operated on concurrently as a group, or iteratively by applying the same operations to constituent databases within the group until all constituent databases have been upgraded.

To illustrate, consider a group of single instance databases of a common version and platform with each of the group of single instance databases having restore points configured. The herein-disclosed techniques for upgrading multiple single instance databases of the same version to a new common version results in a consistent upgrade path. Moreover, a user can use the event of determining such an upgrade path as an opportunity to standardize the environments. Such standardization can include multiple aspects. For example, standardization can apply to the destination version and/or destination location of the database, and can also apply to consistency with respect to the set of patches that are to be applied to each instance of a group of single instance databases. Such standardization further enables administrators to manage more databases with a common set of operations, thus reducing the overall costs of managing databases.

As a further example, a common grouping (e.g., a homogeneous configuration) also serves to simplify upgrades of databases that share a common restore point configuration.

An advisor engine (see FIG. 1A and FIG. 1B) can identify groupings, thus, based on the outputs of an advisor engine, a planning engine considers multiple groups of databases in order to sequence operations and to exploit parallelism in upgrade operations.

At the conclusion of a planning phase, upgrade schedules are made available and an execution phase can be entered so as to supervise upgrade operation sequencing and parallelization (e.g., as may be found in the upgrade schedules) in order to complete a non-intrusive mass upgrade of multi-database installations.

Definitions

Some of the terms used in this description are defined below for easy reference. The presented terms and their respective definitions are not rigidly restricted to these definitions—a term may be further defined by the term's use within this disclosure.
  The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.
  As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.
  The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts a portion of computing infrastructure (e.g., grid infrastructure 100) forming an environment in which a non-intrusive mass upgrade of multi-database installation can be performed.

The shown grid infrastructure 100 comprises an interconnection grid 103 that serves to connect a particular database (e.g., database $101_{11}$, database $101_{12}$, database $101_{3N}$, etc.) to other operational units within the grid infrastructure. The depicted portion of grid infrastructure 100 shows operational units (e.g., processor cores 105, applications 114) in communication with a set (e.g., in a cluster, or in an array or in another arrangement) of individual databases organized to form a multiple database installation. Such an installation may comprise many instances databases. Instances of databases may serve as primary databases, or standby databases, or backup databases, or snapshot databases, and multiple different databases can run on the same or different hardware. The multiple different databases can run under the same or different operating systems, and/or are configured to run different versions of applications.

In some cases, the grid infrastructure supports diverse applications, and any individual application from among the multiple applications may connect to one or more of the multiple databases. For example, an "accounts payable application" may connect to a first database, while an "engineering code server" application connects to a second database. In some installations there may be many tens or hundreds or thousands (or more) individual databases that are connected to their respective applications. The connections between a database and operational units (e.g., applications 114) are not necessarily one-to-one. Moreover, as computing infrastructure becomes more and more capable, and as storage fabrics become larger and larger, a single installation might support not only the aforementioned many tens or hundreds or thousands (or more) individual databases but also the many tens or hundreds or thousands (or more) individual applications and/or application components (e.g., middleware, database stack components, drivers, etc.). Still more, a single application may connect to multiple databases, and a single database may serve connections to multiple applications. Thus, the complexity of an installation such as depicted by the portion of grid infrastructure 100 as shown grows exponentially as time passes.

At any moment in time, a vendor (e.g., an application vendor, a database vendor, a grid infrastructure vendor, etc.) may offer a product upgrade. However, the vendor many not be apprised of the details of the environment in which the vendor's product offerings are situated. Merely applying a vendors recommended product upgrade in accordance with the vendor's recommended practices may have the desired effect, or it may have unintended consequences. For example, although upgrading an "accounts payable application" at the same time as upgrading the underlying database may serve the intended purpose of upgrading the function of the accounts payable application, in the situation where another application (e.g., a "financial reporting application") from another vendor also relies on a connection to the aforementioned underlying database, it follows that the upgrade of the accounts payable database may have unintended consequences that affect the other application (e.g., the "financial reporting application").

Further, it might be known that there is a soon-to-be-released patch from the vendor of the other application, which patch is provided in order to provide compatibility between the "accounts payable application" and the "financial reporting application". It follows that the upgrade of the "accounts payable application" (and its corresponding database) might not be considered to be upgrade candidates until such time as the patch to provide compatibility between the "accounts payable application" and the "financial reporting application" has been delivered.

In the foregoing example, there is given only one dependency, specifically the availability of the patch. However, in exemplary situations there may be hundreds or thousands (or more) individual components and a commensurately large number of dependencies. There may be reasons to upgrade one or another database (or application), and there may be reasons not to upgrade one or another database (or application).

To analyze the existence and impact of dependencies and/or reasons for upgrading (or not upgrading), and to effect the upgrade(s), the embodiment of FIG. 1A hosts an advisor engine 122, a planning engine 124, and an execution engine 126. The advisor engine 122 serves to retrieve data pertaining to the applications and databases (e.g., installation data 112) and further serves to analyze an installation (e.g., a multiple database installation, as shown) to determine a set of upgrade candidates. In the event that the advisor engine 122 determines that there are upgrade candidates, the advisor may initiate further processing in order to plan the upgrade operations, and then cause the upgrade operations to be executed across the multiple database installation.

Strictly as an illustrative embodiment, the processing to plan the upgrade operations and then cause the upgrade operations to be executed can be performed by operational units such as the shown planning engine 124 and/or the shown execution engine 126. The planning engine and/or the execution engine (and/or the advisor engine) can be implemented using operational units within the grid infrastructure (as shown), or using operational units hosted outside of the grid infrastructure.

When the advisor engine 122 has analyzed an installation to determine a set of upgrade operations, the planning engine can determine an order in which to apply the upgrade operations to upgrade the databases.

Further aspects of the analysis (e.g., dependency analysis, grouping, etc.), planning (e.g., serialization, parallelization), and execution (e.g., task supervision) are further discussed herein-below.

Figure 1B:
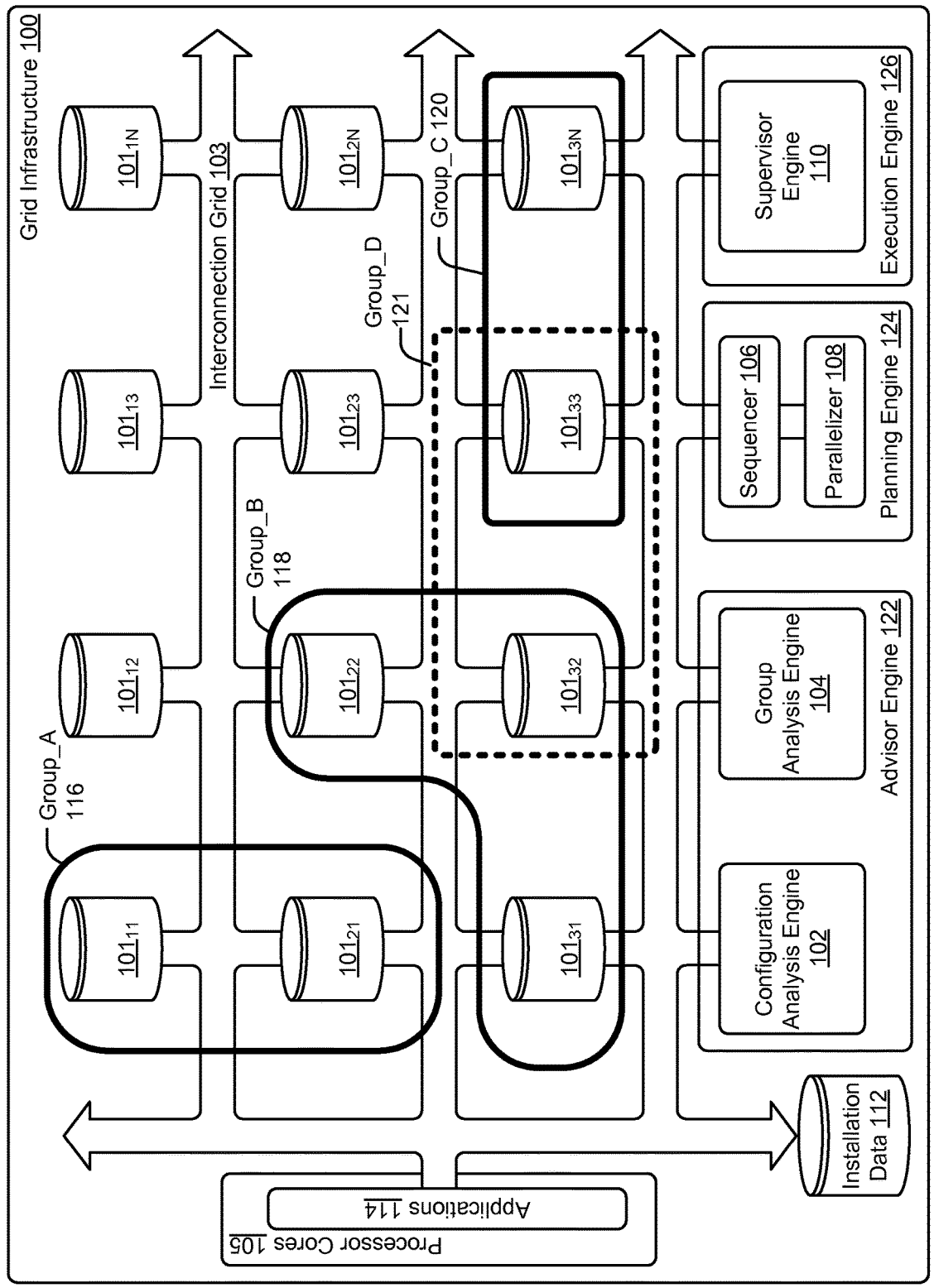
FIG. 1B depicts a partitioning of operations as used in a system for determining upgrade schedules for a non-intrusive mass upgrade of multi-database installations, according to some embodiments.

FIG. 1B depicts a partitioning of operations as used in a system for determining upgrade schedules for a non-intrusive mass upgrade of multi-database installations. As an option, the present partitioning or any aspect thereof may be implemented in the context of the architecture and functionality of the embodiments described herein. Also, the partitioning or any aspect thereof may be implemented in any desired environment. FIG. 1B also depicts a grouping of databases as a result of running the advisor engine.

As shown, the advisor engine 122 comprises a configuration analysis engine 102 and a group analysis engine 104. Both the configuration analysis engine and the group analysis engine can access (e.g., READ, WRITE, etc.) installation data 112. As such the advisor engine can store data for subsequent access by the planning engine and the execution engine. Other techniques for communicating between the advisor engine, the planning engine, and the execution engine are reasonable and envisioned.

The configuration analysis engine facilitates determination of dependencies related to topologies of the grid infrastructure and/or of the interconnect grid and/or of the databases. Strictly as one example, an installation configuration dependency can be based on aspects of the database topology of an upgrade candidate database (e.g., a source database) as compared with a target topology of an intended resulting database (e.g., a target database). A topology can refer to the topology of a file or database layout, or can refer to a topology version, or can refer to a collection of databases. More specifically, a source version and/or a target version can comprise attributes pertaining to topology. For example, attributes pertaining to topology can be applied to platforms, configuration versions, file systems, database layouts, etc. As further discussed below, upgrade options considered by the configuration analysis engine can be at least partially based on topological aspects of the source.

The advisor engine 122 further comprises a group analysis engine 104. In the context of analysis provided by an advisor engine, a group analysis engine can serve to analyze a multiple database installation to determine a set of upgrade candidates (e.g., groups, as shown) and may group any of the individual databases found within the multiple database installation so as to facilitate a mass upgrade. For example, it might be that the constituents of a particular group (e.g., see group_B 118) are dependent on a particular upgraded version of a database as is used by the databases in group_A 116. Accordingly, the group analysis engine might form the shown groups depicted as group_A 116 and group_B 118. Further, any groupings (e.g., further groupings involving group_C 120, and/or group_D 121, etc.) might influence the planning engine 124. The planning engine in turn might prescribe or influence the scheduling of events to accomplish an upgrade to the individual databases from among the set of upgrade candidates. The aforementioned groupings are purely illustrative, and other grouping might be formed to facilitate sequencing (e.g., for enforcing serialized operations) and/or parallelization (e.g., for exploitation of concurrency in a mass upgrade) and/or for any planning purposes. Groups can be non-overlapping (as shown) or constituent databases within a group can be a member of more than one group. Groups can be organized in a hierarchy such that a group at a higher hierarchical level comprises one or more groups at a lower hierarchical level.

As shown, a sequencer 106 and a parallelizer 108 are connected to the configuration analysis engine 102, which is connected to the group analysis engine 104 and to the supervisor engine 110. The flow of data and order of execution of operations attendant to analysis, planning, and execution can be organized in a multi-phase data and operation flow, which is presently discussed.

Figure 2:
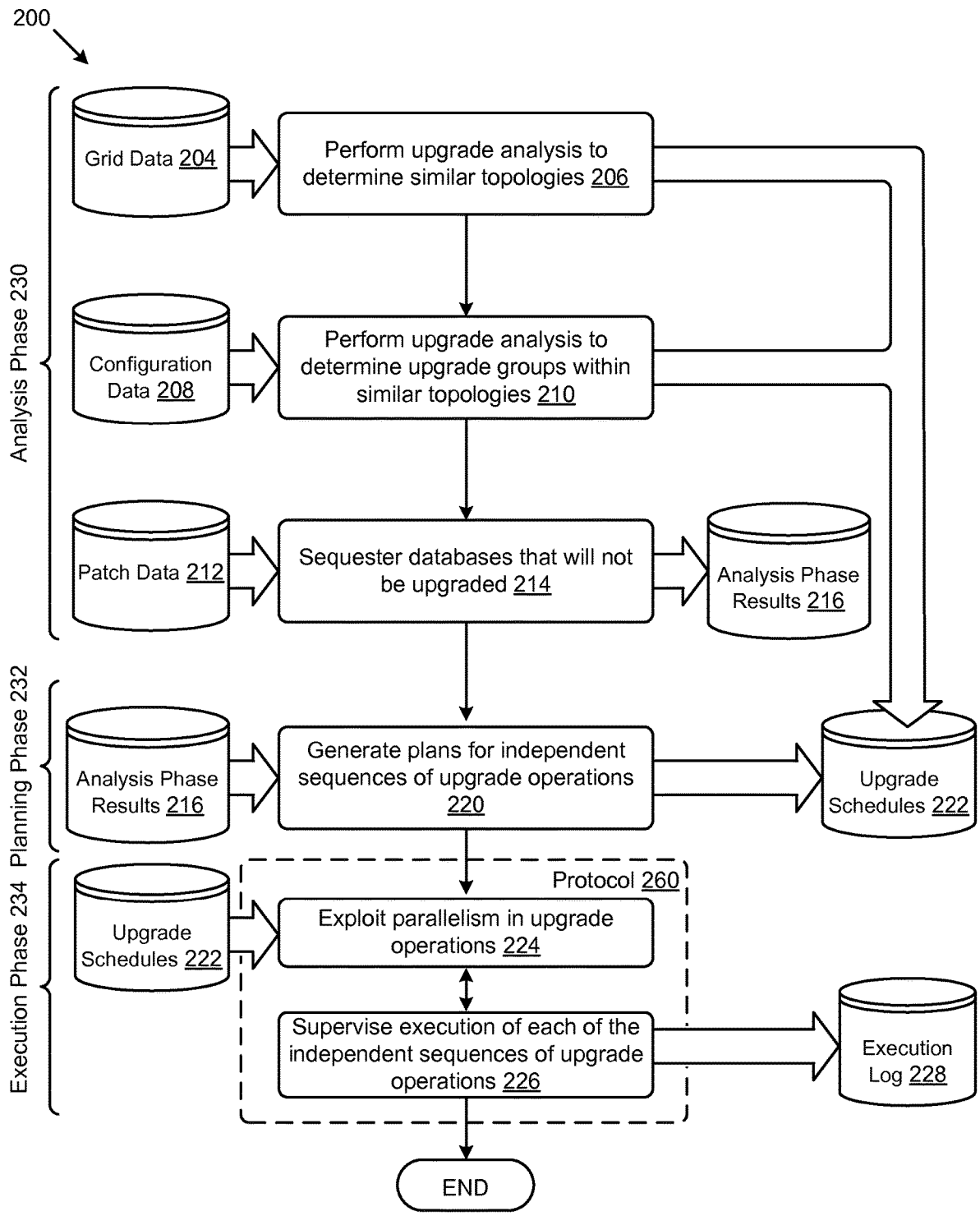
FIG. 2 depicts a multi-phase data and operation flow as used in systems for determining upgrade schedules for a non-intrusive mass upgrade of multi-database installations, according to some embodiments.

FIG. 2 depicts a multi-phase data and operation flow 200 as used in systems for determining upgrade schedules for a non-intrusive mass upgrade of multi-database installations. As an option, the present operation flow 200 or any aspect thereof may be implemented in the context of the architecture and functionality of the embodiments described herein. Also, the operation flow 200 or any aspect thereof may be implemented in any desired environment.

As shown, the flow includes an analysis phase 230, a planning phase 232, and an execution phase 234, which phases each comprise attendant data access and operations.

Analysis Phase

Operations performed in this phase provide "impact analysis" that is in turn used in planning and execution of an upgrade sequence. In some cases the advisor engine uses input to identify what the user wants to do (for example, a user may specify a window during which the upgrade is to be performed). In other cases an advisor engine operates autonomously to schedule upgrades. In still other cases the advisor engine provides a listing of warnings (e.g., warnings of situations or events that can cause an upgrade to fail). Such warnings can be based on the configuration information of the databases (e.g., installation data 112), which configuration information can include support data provided by users (e.g., application users, administrators, and/or application engineers).

This phase also performs an upgrade analysis on all the hosts/databases as may be indicated in the installation data. The installation data can comprise configuration data for the environment such as:

Target version, platform and configuration subject to an upgrade. For example, if the source database is on a file system then the user will see options to upgrade it. The options for the destination topologies are based on the installation configuration of the source environment selected.

Destinations for upgraded databases. The destination locations can be specified using any known technique, and is not limited to conveniences/shorthand notations. Destination location specifications can come in various forms such as:

Same as source host (e.g., for an in-place upgrade).

Different host, same platform (e.g., for a migration upgrade).

Different host, different platform (e.g., for a migration upgrade).

Application-specific information (e.g., identification that a given database is being used by a particular application). Such information may include a version or other upgrade identifier (e.g., to facilitate the case when the database upgrade is the part of an application upgrade).

Operations in the analysis phase include checks that are performed, the results of which checks can be detailed in a report (e.g., a report for the planning engine, and/or a report for a user. Some of the checks include:

Host and operating system checks. These checks can retrieve and analyze available disk space, operating system certification, temporary space quota/requirements, kernel parameter settings, other OS settings, etc. The results of such checks may preclude certain types of upgrades and/or the results of such checks may precipitate remedial operations such as (for example) to increase a quota.

Database-related configuration checks. Checks in this set can include checks for patches required, time zone settings, source and target CPU compatibility, log of earlier-applied patches initialization parameters, enumeration of components to be upgraded, required table spaces and corresponding sizes, required log file sizes, encryption configuration checks, application-specific checks, etc.

Application-related configuration checks. Checks in this set can include checks for matching agent and/or middleware versions, agent communication services versions, sufficient disk space for cloning, etc.

The foregoing checks can be performed as pertaining to the source environment, and can also be performed for the destination environment. In both cases, a comprehensive list of operating system-, platform-, network-, storage-, database- and application-specific checks are conducted to eliminate or mitigate the occurrence of problems that might be encountered during the upgrade process.

As earlier indicated, the checks may precipitate the act of performing remedies or other configuration operations (e.g., remedial operations) which operations can be performed in any phase. In other cases a remedy might not be known to the extent that it can be automatically performed during the phases of the upgrade. In such a case, a report can be provided to users and/or administrators to offer them visibility into the potential issues and how they could be fixed via administrative intervention.

In the specific implementation of FIG. 2, an operation to perform upgrade analysis to determine similar topologies (see operation 206) retrieves data from a repository (e.g., grid data 204). The determinations from operation 206 can be used by the operation to perform upgrade analysis to determine groups within similar topologies (see operation 210). The operation 210 might access any forms of configuration data 208, which configuration data might contain, for example, a set of readiness checks such as successful completion of previously-applied patches, sufficient physical memory, sufficient memory quotas, etc. The aforementioned topologies can comprise a cluster topology, a distributed server topology, a grid topology, etc.

The results of operation 206 and operation 210 include a listing of databases to be upgraded. In some cases the grid data 204 and/or the configuration data 208 comprises a full list of all databases in the multi-database installation. As such, it is possible to sequester databases that will not be upgraded (see operation 214). It is also possible to identify and sequester databases that will not be upgraded based on the status of previously-applied patches (e.g., see patch data 212). For example, if a particular instance of a database had already been upgraded, it might be excluded from at least some portions of a mass patch upgrade (e.g., since the patch has already been installed). In related situations, a database might be excluded from some portions of a mass upgrade, but not excluded from other portions of the upgrade event. Strictly as one example, if a particular instance of a database had already been upgraded via a patch installation, it might be excluded from the mass patch application, but might not be excluded from any post-upgrade testing.

Continuing the discussion of FIG. 2, the results of analysis phase 230 includes a codification of the analysis. Such codification can be provided to agents in subsequent phases (e.g., via inter-process communication) and/or can be stored as analysis phase results (e.g., in the shown analysis phase results 216).

Now, given a codification of the results of the analysis phase, processing proceeds to the planning phase 232.

Planning Phase

The planning phase uses analysis phase results to generate plans (e.g., one or more schedules) for independent sequences of upgrade operations (e.g., see operation 220). For example, if the analysis phase results indicates two groups, and between the indicated two groups there are no interdependencies, then the planning phase might schedule respective upgrade operations for each of the two groups to begin concurrently. As another example, if the analysis phase results indicates two groups, there is a relationship between the indicated two groups such that the first group needs to finish at least some portion of the upgrade operations (e.g., a patch) before beginning the upgrade of the second group, then the planning phase might schedule upgrade operations for the second of the two groups to begin only after the upgrade operations for the first group has completed. To facilitate this, the planning phase might employ a planning engine comprised of a sequencing engine (e.g., sequencer 106) and a concurrency exploitation engine (e.g., parallelizer 108). The planning phase can output a plan of upgrade operations (e.g., upgrade schedules 222) for user review and/or to drive execution of the upgrade operations in an execution phase.

Execution Phase

The plan of upgrade operations (e.g., upgrade schedules 222) serve as inputs to the execution phase. Execution is carried out in accordance with the given schedule, and results are logged.

As earlier discussed, some aspects of parallelism can be known a priori and can be codified into a schedule. Other aspects of parallelism can be exploited, but the possibility to exploit parallelism might not be known until various operations are already in process. Accordingly, the execution phase 234 may include operations to exploit parallelism in upgrade operations (see operation 224). Further, the operations to exploit parallelism in upgrade operations may be carried out in coordination with a supervisor. As shown, the operations to supervise execution of each of the independent sequences of upgrade operations (see operation 226) carry out an ongoing bidirectional protocol (see protocol 260).

At the conclusion of protocol 260, various results of execution have been logged (e.g., see execution log 228). At some point the supervisor deems that each of the independent sequences of upgrade operations have completed, and the multi-phase data and operation flow 200 can end. The execution log can be reviewed. In some cases, the execution log can be reviewed using a graphical user interface.

FIG. 3 depicts a graphical user interface 300 to identify group attributes as used in systems for determining upgrade schedules for a non-intrusive mass upgrade of multi-database installations. As an option, the present graphical user interface 300 or any aspect thereof may be implemented in the context of the architecture and functionality of the embodiments described herein. Also, the graphical user interface 300 or any aspect thereof may be implemented in any desired environment.

As shown, the group attribute graphical user interface is organized by group (e.g., Group_A, Group_B, Group_C), and any graphical user interface screen device for a group can be partially expanded (see area 302) or fully-expanded (see area $304_1$ and area $304_2$) or collapsed (see area 306). A fully-expanded or partially-expanded group graphical user interface screen device shows the constituent nodes, the database version, the platform, etc. A fully-expanded group graphical user interface screen device shows additional information such as the status of a readiness check, the database target, a URL or URI or other path to the home directory, etc. A group graphical user interface screen device might also display a sequence of operations performed during the upgrade.

The group attribute graphical user interface can be displayed during or after an execution phase, or a group attribute graphical user interface can be displayed before commencing the execution phase. For example, and as earlier indicated, warnings can be provided to users, and such warnings can be presented in conjunction with a group attribute graphical user interface. When a group attribute graphical user interface is displayed before commencing the execution phase, the user interface can be used to highlight aspects of the analysis and/or plan. Strictly as examples, the readiness indicator (e.g., see area $304_2$) might indicate a readiness aspect that can be remedied by a user, or as an example, a user interface could permit a user to sequester databases, possibly to exclude an entire group from a mass upgrade, or to exclude a particular database from a group, etc.

Aspects of a particular group can be codified in a data structure, and stored and retrieved. A user interface such as the graphical user interface 300 can facilitate user perusal of groups and group attributes at any point in time during the lifecycle of an installation.

Figure 4:
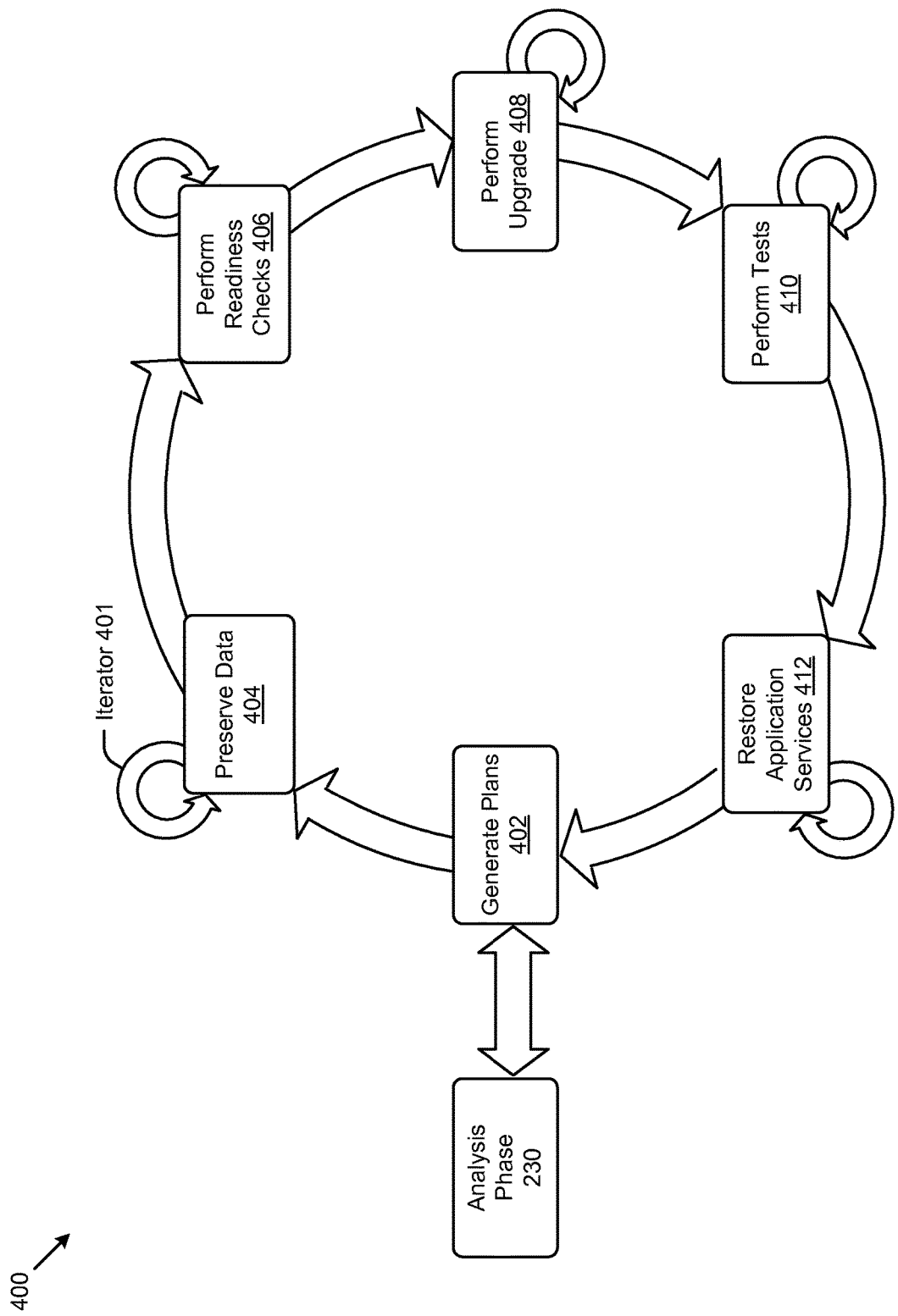
FIG. 4 depicts a repeatable lifecycle showing an initial entry upon determining upgrade schedules for a non-intrusive mass upgrade of multi-database installations, according to some embodiments.

FIG. 4 depicts a repeatable lifecycle 400 showing an initial entry upon determining upgrade schedules for a non-intrusive mass upgrade of multi-database installations. As an option, the present lifecycle 400 or any aspect thereof may be implemented in the context of the architecture and functionality of the embodiments described herein. Also, the lifecycle 400 or any aspect thereof may be implemented in any desired environment.

As shown, the lifecycle comprises six stages:
Stage 1: Generate Plans 402,
Stage 2: Preserve Data 404,
Stage 3: Perform Readiness Checks 406,
Stage 4: Perform Upgrade 408,
Stage 5: Perform Tests 410, and
Stage 6: Restore Application Services 412.

Some of the stages operate on groups, and may initiate operations to iterate over individual instances of a database. Some operations can be performed on multiple instances concurrently, while some operations are performed on multiple instances in a sequence. Some of the stages shown in FIG. 4 include an iterator (e.g., see iterator 401), which indicates a likelihood that the respective stage would apply operations iteratively over multiple groups and/or over multiple individual databases.

Stage 1: Generate Plans

This stage might be entered after an analysis phase 230. The operations carried out to generate plans might overlap with operations carried out in the planning phase. Specifically, the generate plans stage might be similar or identical (or different) from the operations to generate plans for independent sequences of upgrade operations as discussed in FIG. 2. The operations carried out to generate plans might include invoking any one or more of the operations in the aforementioned analysis phase 230. In any of these or other cases, the lifecycle proceeds to stage 2, during which any one or more fail safe measures may be taken to preserve data even in the event of some failure or interruption of the mass upgrade.

Stage 2: Preserve Data

This stage provides various options to preserve the source environment and collect any testing information from the source environment. This stage includes user interaction to select a "zero downtime upgrade option" or other migration options, including any options that do not make changes to the source environment.

In some cases a user might elect to perform a database backup, and/or engage a checkpointing facility (e.g., to perform a periodic checkpoint, a rolling checkpoint, an incremental checkpoint, etc.), and/or take a snapshot of the database configuration to be used as a template in the case of recreating the database from scratch. Strictly as examples, a user might define a restoration policy and/or procedure to invoke in case an upgrade cannot complete normally (e.g., in the case of a power outage or a disaster scenario). In some cases, a user creates and saves a snapshot instance of the database just prior to the upgrade. This may be accomplished in several ways:

Taking a backup of the database just prior to the upgrade.
Creating a guaranteed restore point, possibly involving a previously saved backup plus changes to reach the restore point.

A system-specific means of preserving the state of the database (e.g., some systems such as filers support vendor-specified techniques for preserving a snapshot).

Or a user might choose other fail safe measures for recovery and for post-upgrade testing. For example, a user might capture a representative workload, which representative workload can be performed during the testing of the upgraded databases (e.g., see perform tests 410). Such a capture might include capture of real experience or user insight in the form of transactions that can be used for application testing after the upgrade. A user might also perform a backup of configuration files and/or save a baseline configuration of the installation.

Step 3: Perform Readiness Checks

This stage (see perform readiness checks 406) prepares the hosts/databases for the upgrade stage. A report is generated after addressing the readiness checks (and performing the remedial actions, if necessary). The report lists the performed readiness checks, and lists any remedial fixes applied, possibly including listing or displaying new values of various parameters along with the respective original values. At this stage, a user will have an option to exclude any groups or individual instances of databases from the upgrade.

Step 4: Perform Upgrade

This stage (see perform upgrade 408) implements a series of upgrade steps. In one embodiment, the steps include the following tasks:

Create an intermediate environment (e.g., to orchestrate a zero downtime upgrade).

Provision, in the intermediate environment, any dependencies needed for the target database. For example, provision the latest stack, provision the single instance high availability facilities, provision the new grid infrastructure, and so on.

Recreate a source database on the intermediate systems.

Start capturing transactions on the source system.

Clone source databases.

Upgrade the cloned installation configuration using the provisioned dependencies; this creates an upgraded installation configuration.

In the upgraded environment, perform any other configuration changes such as establishing and/or setting up streams, high availability features, etc. as may have been specified by the user or administrator.

Step 5: Perform Tests to Verify Upgrade

This stage (see perform tests 410) implements a series of automated tests (e.g., verification tests) on the upgraded environment. For example, one such test might confirm that all of the transactions that were captured during the above upgrade processing have been applied to the upgraded database(s). Some embodiments might comprise committing the actions of the upgrade processes (e.g., performing a database commit operation). In exemplary cases of a commit operation, when an upgrade to a database is committed, it cannot be rolled-back to a previous version. The upgrade can be committed by setting a flag (e.g., a committed flag) corresponding to the upgraded database.

Step 6: Restore Application Services

Once the previous stages of the lifecycle have been completed, then a user or administrator can perform an application switchover operation, which operation serves to deploy the newly upgraded systems. In some cases, "going live" occurs during a user-specified "scheduled maintenance window".

ADDITIONAL EMBODIMENTS OF THE DISCLOSURE

Additional Practical Applications

Figure 5:
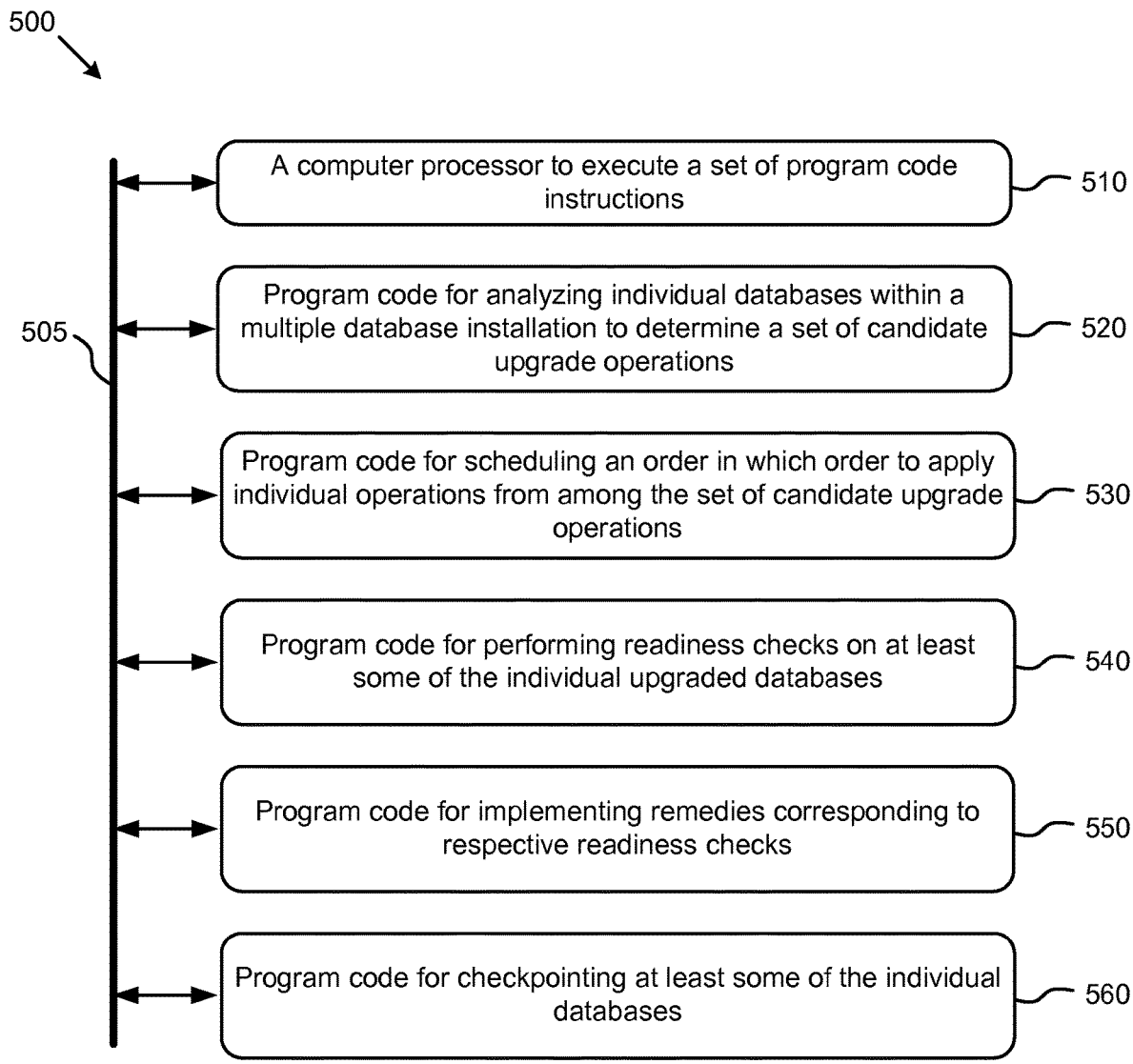
FIG. 5 is a block diagram of a system for determining upgrade schedules for a non-intrusive mass upgrade of multi-database installations, according to some embodiments.

FIG. 5 is a block diagram of a system for determining upgrade schedules for a non-intrusive mass upgrade of multi-database installations, according to some embodiments. FIG. 5 depicts a block diagram of a system to perform certain functions of a computer system. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. An operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: analyzing individual databases within a multiple database installation to determine a set of candidate upgrade operations to apply (see module 520); and scheduling an order in which order to apply individual operations from among the set of candidate upgrade operations to be applied over at least two databases having different versions (see module 530).

In some embodiments additional operations are performed before, during or after the operations of the scheduler. Strictly as examples, program code can be provided for:

Performing readiness checks on at least some of the individual ones of the individual databases (see operation 540).

Implementing remedies corresponding to respective readiness checks (see operation 550).

Checkpointing at least some of the individual databases (see operation 560).

Figure 6:
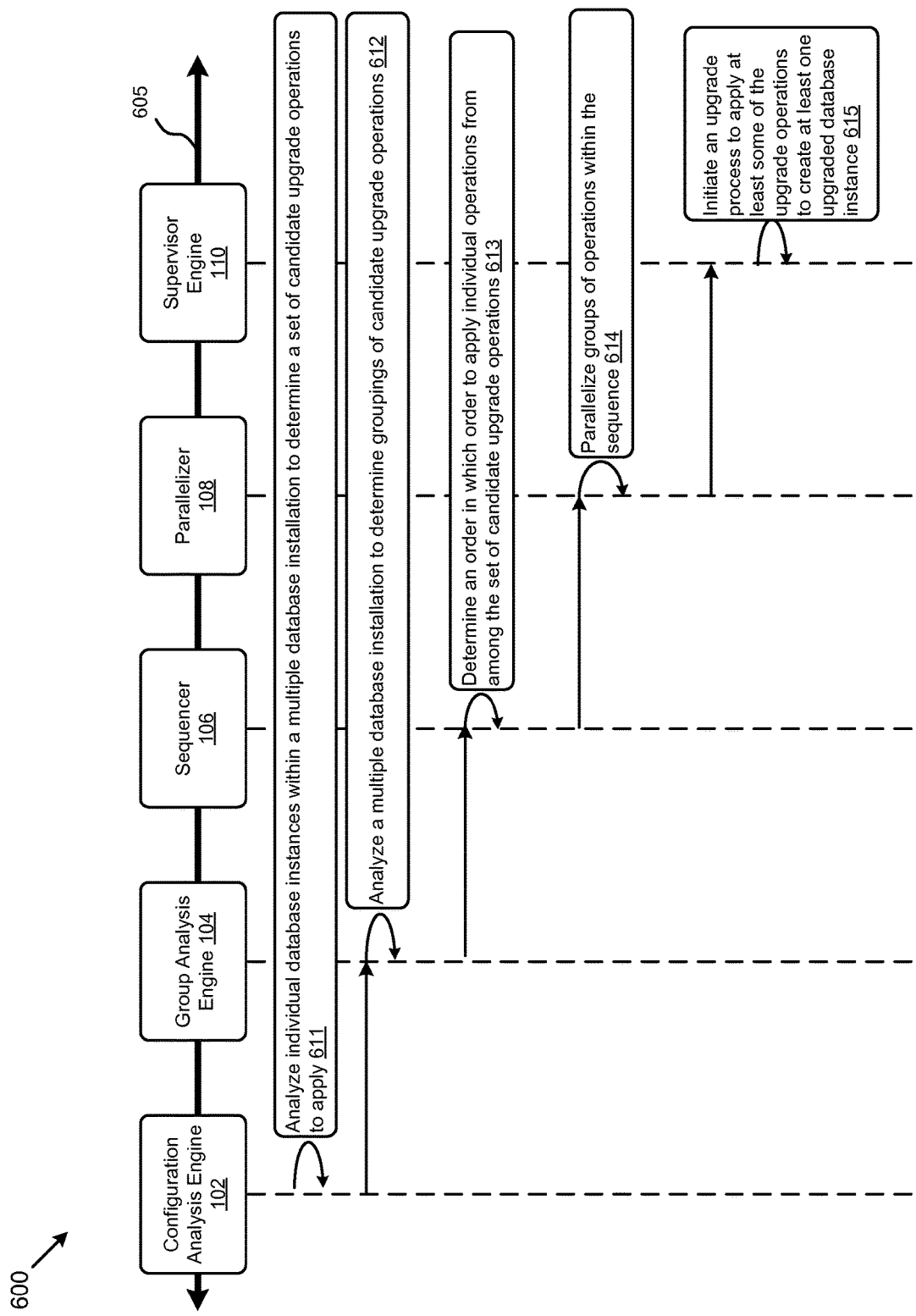
FIG. 6 is a block diagram of a system for determining upgrade schedules for a non-intrusive mass upgrade of multi-database installations, according to some embodiments.

FIG. 6 is a block diagram 600 of a system for determining upgrade schedules for a non-intrusive mass upgrade of multi-database installations, according to some embodiments.

As shown, configuration analysis engine 102 serves to analyze the installation configuration of a multiple database installation to determine a set of compatible candidates upgrade operations to apply (see operation 611). The group analysis engine 104 serves to analyze a multiple database installation to determine groupings of candidate upgrade operations (see operation 612). The engines can communicate to any other engine or unit over communication path 605.

A sequencer 106 serves to determine in which order to apply individual operations from among the set of candidate upgrade operations (see operation 613), and a parallelizer 108 serves to parallelize groups of operations within the sequence (see operation 614). As shown, when the sequence of upgrades to apply upgrade operations has been determined, and the groupings (e.g., for parallelization) has been determined, then a supervisor engine 110 can initiate an upgrade process to upgrade at least one of the database instances of the set of upgrade candidates to create at least one upgraded database instance (see operation 615).

System Architecture Overview

Additional Practical Applications

Returning to the embodiments of FIG. 1A and FIG. 1B, the grid infrastructure 100 can be implemented on any form or forms of computing infrastructure. The operational units may be single-CPU processors or multi-core processor or other implementations of logic and/or program control. The interconnection grid 103 may be implemented using any known technology, including by not limited to busses, backplanes, network media, etc. Such busses, backplanes, and network media can include high-speed inter-processor technologies, ethernet, fibre channel, hypertransport, rapid I/O, etc.

Figure 7:
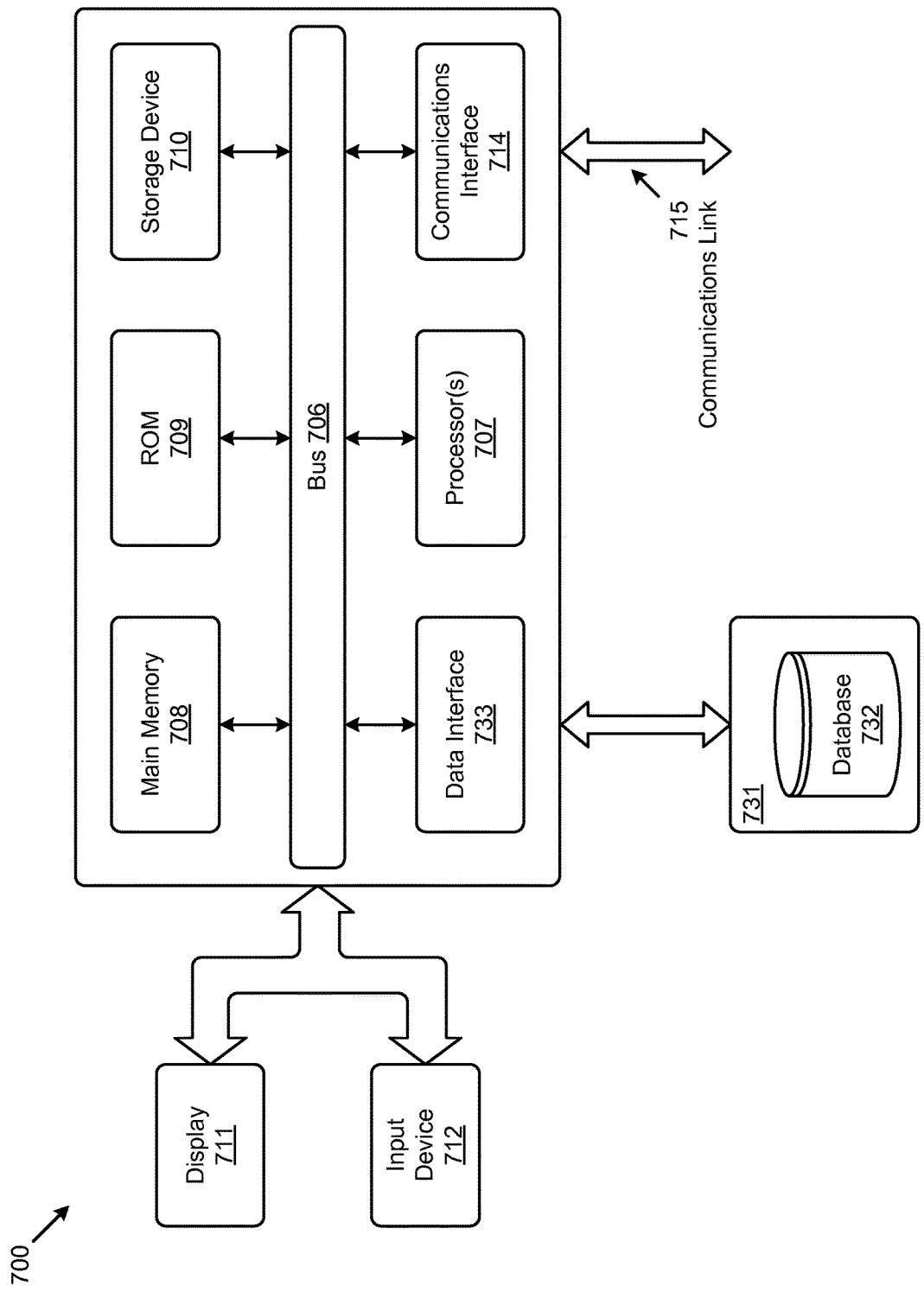
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700.

According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A method comprising:
    identifying a first subset of a set of databases in a multi-database environment, based on a first set of shared criteria of the first subset of databases;
    identifying a second subset of the set of databases in the multi-database environment, based on a second set of shared criteria of the second subset of databases, wherein the first subset of databases and the second subset of databases include at least one differing database;
    identifying a first plurality of candidate upgrade operations to be applied to a first plurality of database system components associated with each of the first subset of databases;
    identifying a first set of one or more scheduling dependencies associated with the first plurality of candidate upgrade operations, wherein identifying the first set of scheduling dependencies comprises:
        (a) determining that a first candidate upgrade operation, of the first plurality of candidate upgrade operations, is configured to upgrade a first database system component in the first plurality of database system components from a first version to a second version,
        (b) determining, based on a set of one or more compatibility rules, that the second version of the first database system component requires at least a first minimum version of a second database system component; and
    based on the first set of scheduling dependencies, generating a first group-specific upgrade path applicable to each of the first subset of databases, wherein a second candidate upgrade operation, of the first plurality of candidate upgrade operations, upgrading the second database system component to at least the first minimum version precedes the first candidate upgrade operation upgrading the first database system component to the second version;
    identifying a second plurality of candidate upgrade operations to be applied to a second plurality of database system components associated with each of the second subset of databases;
    identifying a second set of one or more scheduling dependencies associated with the second plurality of candidate upgrade operations;
    based on the second set of scheduling dependencies, generating a second group-specific upgrade path applicable to each of the second subset of databases;
    identifying a third set of one or more scheduling dependencies associated with at least the first group-specific upgrade path and the second group-specific upgrade path, wherein identifying the third set of scheduling dependencies comprises:
        determining that a third candidate upgrade operation, of the first plurality of candidate upgrade operations, is configured to upgrade a third database system component, of the first plurality of database system components, from a third version to a fourth version;
        determining that the fourth version of the third database system component requires at least a second minimum version of a fourth database system component of the second plurality of database system components;
    based on the third set of scheduling dependencies, generating an environment-wide upgrade path that integrates at least the first group-specific upgrade path and the second group-specific upgrade path, wherein a fourth candidate upgrade operation, of the second plurality of candidate upgrade operations, upgrading the fourth database system component to at least the second minimum version precedes the third candidate upgrade operation upgrading the first database system component to the second version;
    wherein the method is performed by at least one device including a hardware processor.

2. The method of claim 1, further comprising performing readiness checks on at least one database of the first subset of databases.

3. The method of claim 2, further comprising implementing remedies corresponding to respective readiness checks.

4. The method of claim 3, further comprising performing checks that two or more remedies are compatible with a respective other remedy.

5. The method of claim 1, further comprising performing a checkpointing operation on at least one database of the first subset of databases.

6. The method of claim 1, further comprising:
    performing a mass upgrade of the first subset of databases according to the first group-specific upgrade path.

7. The method of claim 6, further comprising:
    determining that one or more candidate upgrade operations in the first plurality of candidate upgrade operations have already been applied to a particular database in the first subset of databases; and
    based on determining that the one or more candidate upgrade operations have already been applied to the particular database, excluding the particular database from at least part of the mass upgrade.

8. The method of claim 7, further comprising:
    performing a post-upgrade test on the first subset of databases including the particular database that was excluded from at least part of the mass upgrade.

9. The method of claim 6, wherein the mass upgrade is a parallel upgrade, such that one or more operations in the first plurality of candidate upgrade operations are applied to the first subset of databases concurrently.

10. The method of claim 1, further comprising:
generating an upgrade advisory comprising a user notification of the first group-specific upgrade path applicable to the first subset of databases.

11. One or more non-transitory machine-readable media storing instructions which, when executed by one or more processors, cause:
identifying a first subset of a set of databases in a multi-database environment, based on a first set of shared criteria of the first subset of databases;
identifying a second subset of the set of databases in the multi-database environment, based on a second set of shared criteria of the second subset of databases, wherein the first subset of databases and the second subset of databases include at least one differing database;
identifying a first plurality of candidate upgrade operations to be applied to a first plurality of database system components associated with each of the first subset of databases;
identifying a first set of one or more scheduling dependencies associated with the first plurality of candidate upgrade operations, wherein identifying the first set of scheduling dependencies comprises:
(a) determining that a first candidate upgrade operation, of the first plurality of candidate upgrade operations, is configured to upgrade a first database system component in the first plurality of database system components from a first version to a second version,
(b) determining, based on a set of one or more compatibility rules, that the second version of the first database system component requires at least a first minimum version of a second database system component; and
based on the first set of scheduling dependencies, generating a first group-specific upgrade path applicable to each of the first subset of databases, wherein a second candidate upgrade operation, of the first plurality of candidate upgrade operations, upgrading the second database system component to at least the first minimum version precedes the first candidate upgrade operation upgrading the first database system component to the second version;
identifying a second plurality of candidate upgrade operations to be applied to a second plurality of database system components associated with each of the second subset of databases;
identifying a second set of one or more scheduling dependencies associated with the second plurality of candidate upgrade operations;
based on the second set of scheduling dependencies, generating a second group-specific upgrade path applicable to each of the second subset of databases;
identifying a third set of one or more scheduling dependencies associated with at least the first group-specific upgrade path and the second group-specific upgrade path, wherein identifying the third set of scheduling dependencies comprises:
determining that a third candidate upgrade operation, of the first plurality of candidate upgrade operations, is configured to upgrade a third database system component, of the first plurality of database system components, from a third version to a fourth version;
determining that the fourth version of the third database system component requires at least a second minimum version of a fourth database system component of the second plurality of database system components;
based on the third set of scheduling dependencies, generating an environment-wide upgrade path that integrates at least the first group-specific upgrade path and the second group-specific upgrade path, wherein a fourth candidate upgrade operation, of the second plurality of candidate upgrade operations, upgrading the fourth database system component to at least the second minimum version precedes the third candidate upgrade operation upgrading the first database system component to the second version.

12. The one or more media of claim 11, the operations further comprising performing readiness checks on at least one of the databases.

13. The one or more media of claim 12, the operations further comprising implementing remedies corresponding to respective readiness checks.

14. The one or more media of claim 11, further storing instructions which, when executed by one or more processors, cause:
performing a mass upgrade of the first subset of databases according to the first group-specific upgrade path.

15. The one or more media of claim 14, further storing instructions which, when executed by one or more processors, cause:
determining that one or more candidate upgrade operations in the first plurality of candidate upgrade operations have already been applied to a particular database in the first subset of databases; and
based on determining that the one or more candidate upgrade operations have already been applied to the particular database, excluding the particular database from at least part of the mass upgrade.

16. The one or more media of claim 15, further storing instructions which, when executed by one or more processors, cause:
performing a post-upgrade test on the first subset of databases including the particular database that was excluded from at least part of the mass upgrade.

17. The one or more media of claim 14, wherein the mass upgrade is a parallel upgrade, such that one or more operations in the first plurality of candidate upgrade operations are applied to the first subset of databases concurrently.

18. The one or more media of claim 11, further storing instructions which, when executed by one or more processors, cause:
generating an upgrade advisory comprising a user notification of the first group-specific upgrade path applicable to the first subset of databases.

19. The one or more media of claim 11, wherein the environment-wide upgrade path allows at least one of the first plurality of candidate upgrade operations and at least one of the second plurality of candidate upgrade operations to be performed concurrently.

20. The one or more media of claim 11, further storing instructions which cause:
during execution of one or more of at least one of the first plurality of candidate upgrade operations and the second plurality of candidate upgrade operations:
determining that at least one of the first plurality of candidate upgrade operations and at least one of the second plurality of candidate upgrade operations are allowed to be performed concurrently.

21. The one or more media of claim 11, further storing instructions which cause:
   concurrently performing at least one of the first plurality of candidate upgrade operations and at least one of the second plurality of candidate upgrade operations.

22. The one or more media of claim 11, wherein the environment-wide upgrade path requires that the second plurality of candidate upgrade operations of the second group-wide upgrade path precedes the first plurality of candidate upgrade operations of the first group-wide upgrade path.

23. A system comprising:
   at least one device including a hardware processor;
   the system being configured to perform operations comprising:
   identifying a first subset of a set of databases in a multi-database environment, based on a first set of shared criteria of the first subset of databases;
   identifying a second subset of the set of databases in the multi-database environment, based on a second set of shared criteria of the second subset of databases, wherein the first subset of databases and the second subset of databases include at least one differing database;
   identifying a first plurality of candidate upgrade operations to be applied to a first plurality of database system components associated with each of the first subset of databases;
   identifying a first set of one or more scheduling dependencies associated with the first plurality of candidate upgrade operations, wherein identifying the first set of scheduling dependency dependencies comprises:
   (a) determining that a first candidate upgrade operation, of the first plurality of candidate upgrade operations, is configured to upgrade a first database system component in the first plurality of database system components from a first version to a second version,
   (b) determining, based on a set of one or more compatibility rules, that the second version of the first database system component requires at least a first minimum version of a second database system component; and
   based on the first set of scheduling dependencies, generating a first group-specific upgrade path applicable to each of the first subset of databases, wherein a second candidate upgrade operation, of the first plurality of candidate upgrade operations, upgrading the second database system component to at least the first minimum version precedes the first candidate upgrade operation upgrading the first database system component to the second version;

identifying a second plurality of candidate upgrade operations to be applied to a second plurality of database system components associated with each of the second subset of databases;

identifying a second set of one or more scheduling dependencies associated with the second plurality of candidate upgrade operations;

based on the second set of scheduling dependencies, generating a second group-specific upgrade path applicable to each of the second subset of databases;

identifying a third set of one or more scheduling dependencies associated with at least the first group-specific upgrade path and the second group-specific upgrade path, wherein identifying the third set of scheduling dependencies comprises:
   determining that a third candidate upgrade operation, of the first plurality of candidate upgrade operations, is configured to upgrade a third database system component, of the first plurality of database system components, from a third version to a fourth version;
   determining that the fourth version of the third database system component requires at least a second minimum version of a fourth database system component of the second plurality of database system components;

based on the third set of scheduling dependencies, generating an environment-wide upgrade path that integrates at least the first group-specific upgrade path and the second group-specific upgrade path, wherein a fourth candidate upgrade operation, of the second plurality of candidate upgrade operations, upgrading the fourth database system component to at least the second minimum version precedes the third candidate upgrade operation upgrading the first database system component to the second version.

* * * * *

UNITED STATES PATENT AND TRADEMARK OFFICE
CERTIFICATE OF CORRECTION

PATENT NO. : 10,579,599 B2
APPLICATION NO. : 14/086751
DATED : March 3, 2020
INVENTOR(S) : Nigam et al.

Page 1 of 1

It is certified that error appears in the above-identified patent and that said Letters Patent is hereby corrected as shown below:

In the Claims

In Column 21, Line 32, in Claim 23, after "scheduling" delete "dependency".

Signed and Sealed this
Twenty-seventh Day of October, 2020

Andrei Iancu
*Director of the United States Patent and Trademark Office*